United States Patent Office

Re. 28,157
Reissued Sept. 10, 1974

28,157

TRANSMITTER WITH MEANS FOR GENERATING THE CARRIER WAVE BEFORE GENERATING THE MODULATION COMPONENTS

Keith H. Wycoff, P.O. Box 308,
Lexington, Nebr. 68850

Original No. 3,619,784, dated Nov. 9, 1971, Ser. No. 16,037, Mar. 3, 1970. Application for reissue Jan. 31, 1972, Ser. No. 222,390
Int. Cl. H04b *1/02*
U.S. Cl. 325—155 19 Claims

Matter enclosed in heavy brackets [ ] appears in the original patent but forms no part of this reissue specification; matter printed in italics indicates the additions made by reissue.

ABSTRACT OF THE DISCLOSURE

There is disclosed an electronic switching device having a transmitter-energized position for coupling a source of operating voltage to a carrier-wave-generating circuit, a further switch coupled to the electronic switch having one position causing the electronic switch to be placed in its transmitter-energized position, a control circuit which provides energizing signals when the further switch is placed in its first position and then in its second position, which energizing signals cause a circuit to generate information for modulation on the carrier wave, a holding circuit which, in the presence of the energizing signals, maintains the energizing switch closed despite placement of the further switch in its second portion.

Figure 1:
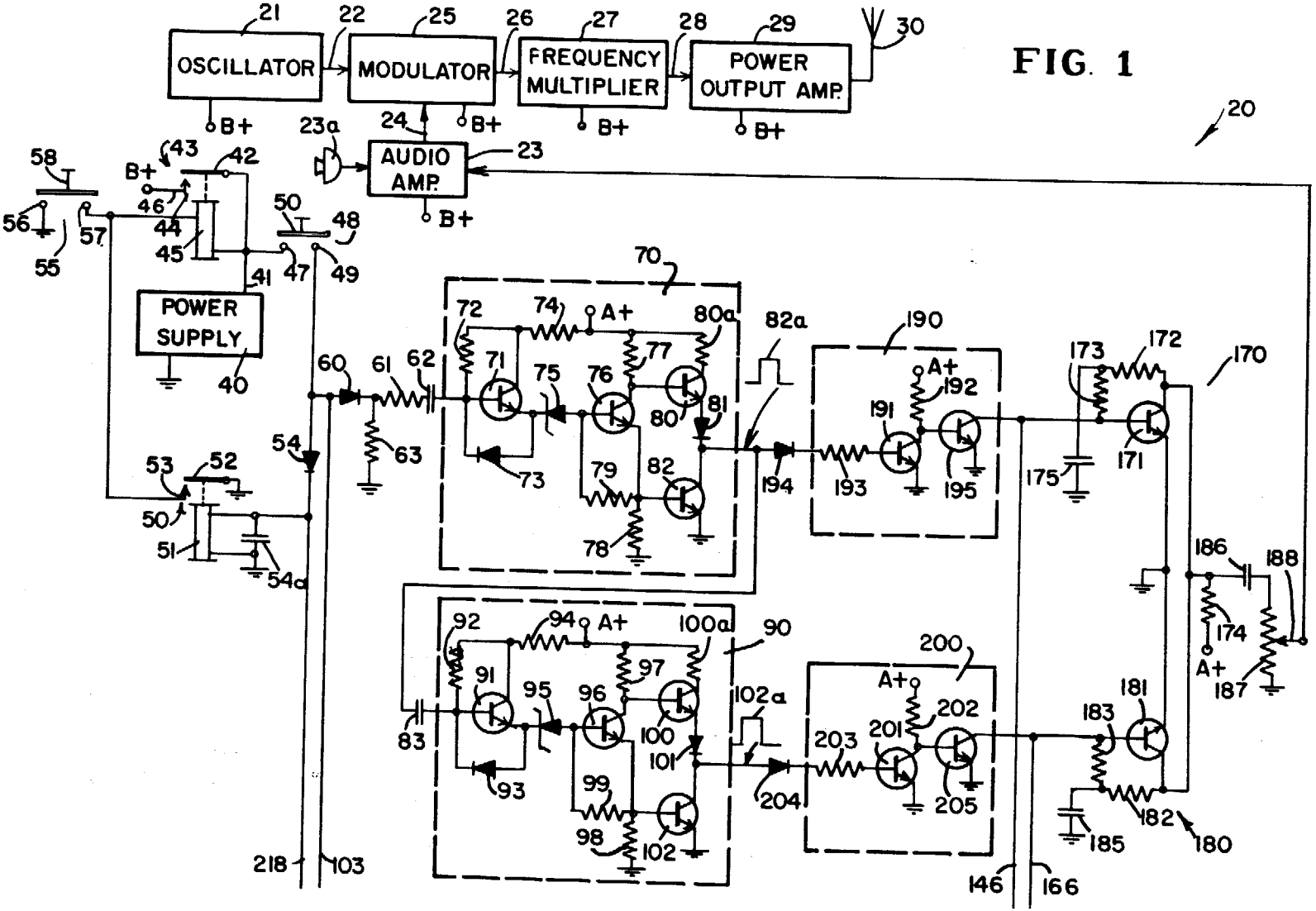

The present invention relates to communication transmitters wherein the information is frequency modulated on a carrier wave.

It is an important object of the present invention to provide a transmitter wherein the carrier wave is generated prior to any information being generated.

Another object of the present invention is to provide an improved transmitter for use in a selective calling communication system, which transmitter first generates a carrier wave and thereafter modulates the carrier wave with at least one control tone to unsquelch a selected receiver.

Yet another object of the present invention is to provide a transmitter for use in a selective calling communication system, which transmitter generates a sequence of control tones, the overall duration of which is minimized.

Still another object of the invention is to provide a transmitter for use in a selective calling communication system, wherein transmission of the entire control tone or tone is insured.

Another object of the invention is to provide a transmitter with an manually operated spring-[loaded] loaded switch, actuation of which switch causes a carrier wave to be generated and release of which switch causes at least one control tone to be generated and modulate the carrier wave.

Another object of the invention is to provide a control system for use in a selective calling transmitter which causes the tone or tones to be generated thereby to be of constant duration independently of the warmup and other characteristics of the circuit which generates the carrier wave.

Still another object of the invention is to provide an electronic switching device for coupling the source of operating voltage to a carrier-wave-generating circuit, a further switch coupled to the electronic switch which, when actuated, places the electronic switch in its transmitter-energized position, and a control circuit which provides energizing signals for actuating an information-generating circuit upon placement of the further switch in its first position and thereafter in its second position.

In connection with the foregoing object, it is another object of the invention to provide a holding circuit coupled to the control circuit and to the electronic switch and responsive to the energizing signals to maintain the electronic switch closed, desite its being in its second position.

Yet another object of the present invention is to provide first and second tone-generating circuits for a selective calling transmitter, a switch which, when operated causes an operating voltage to be applied to a carrier-wave-generating circuit, a first pulse generator responsive to the placement of the switch in one position and thereafter in its other position to provide a first pulse of limited duration for actuating the first tone-generating circuit, a second pulse generator responsive to the termination of the first pulse to provide a second pulse to actuate the second tone-generating circuit.

In connection with the foregoing object, it is another object of the invention to provide a third pulse generator responsive to the placement of the switch in the one position and thereafter in the other position to provide a third pulse having a duration at least equal to the combined duration of the first and second pulses and commencing substantially with commencement of the first pulse.

Further features of the invention pertain to the particular arrangement of the elements of the transmitter and the component circuits thereof, wherebythe above-outlined and additional operating features thereof are attained.

Figure 2:
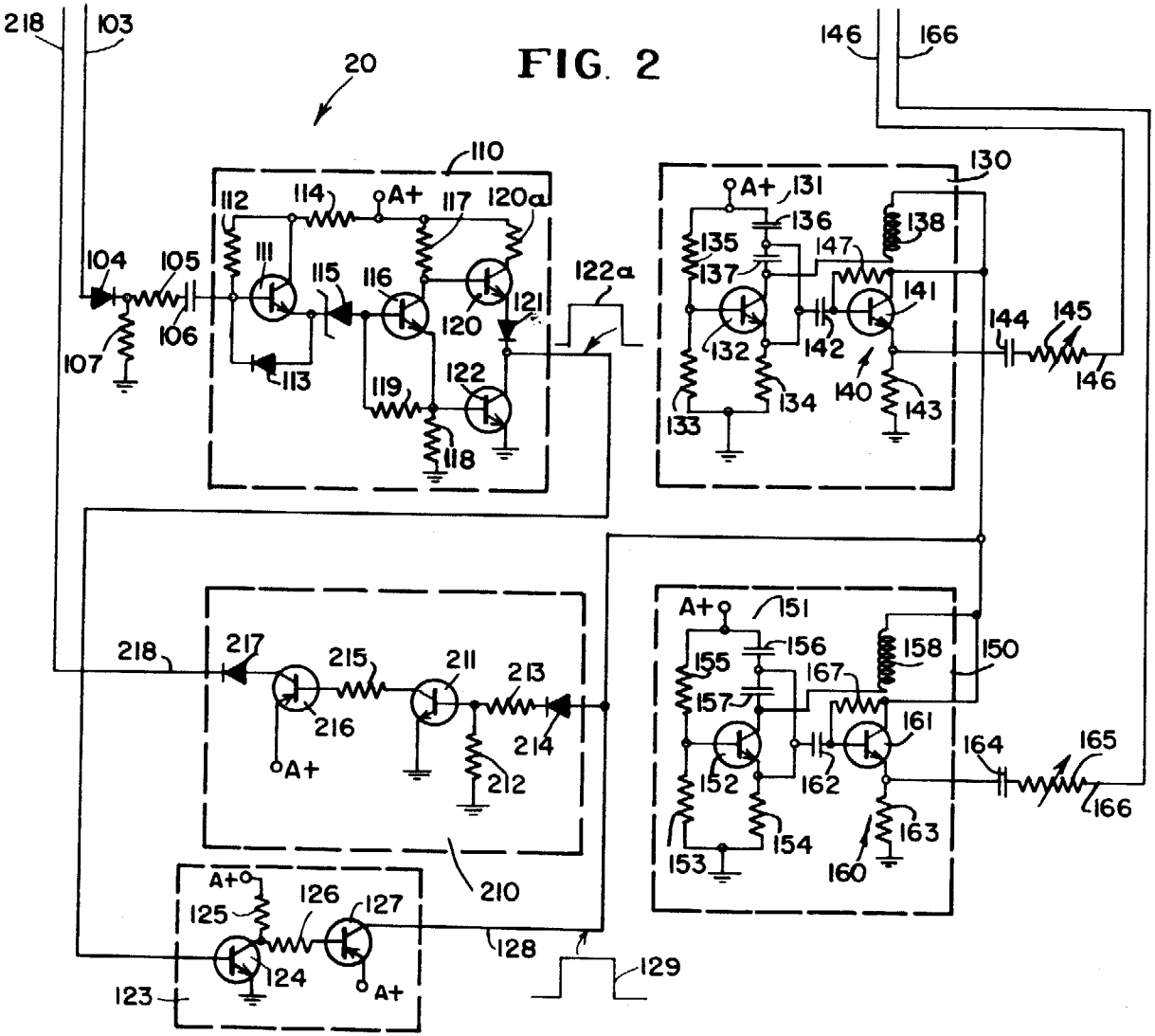

The invention, both as to its organization and method of operation, together with further objects and advantages thereof, will best be understood by reference to the following specification taken in connection with the accompanying drawings, in which:

FIG. 1 and 2 are partially schematic and partially block diagrams of a transmitter made in accordance with and embodying the principles of the present invention.

Referring now to FIGS. 1 and 2 of the drawings, there is shown a communication transmitter 20 made in accordance with and embodying the principles of the present invention. The transmitter 20 is adapted to generate an RF carrier wave modulated selectively by audio signals and one or more control tones. Basically, the transmitter 20 is for use in a selective calling communication system which comprises, in addition to the transmitter, a number of receivers, all capable of processing the same frequency carrier wave. Each receiver is squelched in its standby condition and is automatically unsquelched with a carrier wave modulated by the proper control tone or set of control tones for which that receiver is designed. Each receiver will respond to a different control tone or set of control tones, whereby the operator at the transmitter can call a selected receiver without energizing any of the other receivers. In a communication system equipped to transmit and receive voice, the operator at the transmitter, wishing to communicate with a specific receiver or receiver, selects the proper set of control tones for that receiver, which tones are modulated on the carrier wave. The selected receiver will become unsquelched, whereupon the operator can actuate the push-to-talk switch and speak into the microphone. The sounds, of course, are converted into audio signals which are modulated on the carrier wave, the modulated carrier wave being processed by the selected receiver and reconverted to sound waves.

In such selective calling communication systems, it is desirable that the time consumed by transmitting the control tones be minimized in order to maximize the time available for information transmission and minimize annoyance to people listening to the channel. Thus, if, for example, the particular selective calling communication system operates on the transmission of two control tones transmitted in sequence, the duration of each control tone should be as short as possible, and, at the ame time, the tones should be long enough to insure that they will render operable the selected receiver. In the past, it has been found that, when the operator actuates the push-to-talk switch, the simultaneous generating of the carrier wave and the control tones causes an initial portion of the first control tone to be lost because the carrier wave had not yet been fully on. In order to overcome this, the duration of the first control tones was increased to such an extent that, even if its initial portion was lost when the carrier wave was generated, there would be enough left of the first control tone to energize properly the selected receiver. This, however undesirably prolonged the duration of the first control tone. Another often-used practice is to delay commencement of the first control tone until the carrier wave was fully on. However, this, too, undesirably postponed the time at which the tones ceased. Moreover, the time at which the carrier wave was generated would, of course, vary in different types of transmitters, particularly between transistorized and tube-type sets, and even would vary from transmitter to transmitter with the same design. The invention herein disclosed insures that the carrier wave will be fully on before the control tones are modulated thereon and enables the entire control tone to be modulated on the carrier wave independently of the time at which the carrier wave is produced.

The portion of the transmitter 20 shown in FIG. 1 includes an oscillator 21 which develops on its output conductor 22 a relatively low frequency oscillatory signal. An audio amplifier 23 has its output coupled though a conductor 24 to a first input of a modulator 25, the second input thereof being coupled along the conductor 22 from the oscillator 21. The signals on the conductor 24, which may be either audio signals produced by conversion of sound waves applied to a microphone 23a or the control tones, are modulated by the modulator 25 onto the relatively low frequency oscillatory signal. The modulated oscillatory signal is applied along the conductor 26 to a frequency multiplier 27 which increases the frequency of the oscillatory signal. The relatively high frequency signal is applied along a conductor 28 to a power output amplifier 29 where the signal strength is increased, thereby to provide a high level, frequency-multiplied carrier wave which is emitted from an antenna 30.

The transmitter 20 also comprises a power supply 40 which, in a stationary transmitter, is supplied by a conventional 117-volt 60-cycle AC source, and which, in a mobile transmitter, is typically supplied from batteries or a portable generator. The power supply 40 has an output conductor 41 coupled to one contact 42 of a relay 43, which relay 43 has a second contact 44 and a winding 45. The relay 43 is energized, in a manner to be presently described, to close the contacts 42 and 44, which provides on the conductor 46 a B+ operating voltage for the various elements of the transmitter 20, including, but not limited to, the oscillator 21, the audio amplifier 23, the modulator 25, the frequency multiplier 27, and the power amplifier 29. The conductor 41 is also coupled to one of the fixed contacts 47 of a manually operable switch 48, which switch also includes a second fixed contact 49 and a movable contact 50 that is spring biased away from the contacts 47 and 49.

There is also provided a second relay 50 having a winding 51 and a pair of contacts 52 and 53. The winding 51 is coupled between ground reference potential and the cathode of a diode 54, the anode of the diode 54 being coupled to the contact 49 of the switch 48. The contact 52 is coupled to ground reference potential and the contact 53 is coupled to the other end of the winding 45. A capacitor 54a is coupled across the winding 51. There is also provided a second manually operable switch 55 which, as will presently be described, constitutes a push-to-talk switch. The switch 55 includes a pair of fixed contacts 56 and 57 respectively coupled to ground reference potential and to the winding 45, the switch 55 also including a movable contact 58 which is spring biased away from the contacts 56 and 57.

In use, the power supply 40 is energized by actuating the main on-off switch (not shown) to provide the operating voltage on the conductor 41. Closure of the manually operable switch 48 causes current to flow through the diode 54 and the winding 51, thereby to energize the relay 50 and cause closure of the contacts 52 and 53. This completes a circuit from the conductor 41 through the winding 45 of the relay 43 and the contacts 52 and 53 of the relay 50, to ground reference potential, whereby current flows through the winding 45 to cause closure of the contacts 42 and 44 to supply B+ operating voltage on the conductor 46. This operating voltage is used, as previously explained, to power the various stages in the transmitter 20. If the manually operable switch 55 is actuated, this, too, will complete a circuit for the winding 45 to cause closure of the contacts 42 and 44 to provide operating voltage on the conductor 46. It should be understood that each of the relays 43 and 50 constitutes an electronic switching device wherein the windings 45 and 51 constitute control elements. By supplying a voltage to these control elements, the contacts associated therewith may be closed. There are other electronic switching means which may be used, such as, for example, a silicon-controlled rectifier, wherein the control element would be the control electrode.

The junction between the contact 49 of the switch 48 and the anode of the diode 54 is coupled through a diode 60, a resistor 61 and a capacitor 62 to a first pulse generator 70. The junction of the resistor 61 and the cathode of the diode 60 is coupled to a resistor 63 which, in turn, is coupled to ground reference potential. The pulse generator 70 includes a first NPN-transistor 71, with a resistor 72 coupled between the collector and base thereof. A diode 73 is coupled between the emitter and base of the transistor 71, the collector thereof being coupled through a resistor 74 to an operating voltage designated by A+ which is derived from the power supply 40, as soon as the main switch is turned on. The emitter of the transistor 71 is coupled by way of a zener diode 75 to the base of a second NPN-transistor 76, the collector of which is coupled through a resistor 77 to the A+ operating voltage, and the emitter of which is coupled by way of a resistor 78 to ground reference potential. A resistor 79 is coupled between the base and emitter of the transistor 76. A third NPN-transistor 80 has its base coupled to the collector of the transistor 76, its collector coupled to the A+ operating voltage by means of a resistor 80a, and its emitter coupled through a diode 81 to the collector of a fourth NPN-transistor 82. The base of the transistor 82 is coupled to the junction of the resistors 78 and 79, and the emitter is coupled to ground reference potential.

The output of the first pulse generator 70 is coupled by way of a capacitor 83 to a second pulse generator 90, which has precisely the same construction as the pulse generator 70, with corresponding elements being labeled with the same reference numerals with 20 added thereto. In the interest of brevity, further detailed description of the construction of the pulse generator 90 will be omitted.

In operation, actuation of the manually operable switch 48, in addition to providing the B+ operating voltage for the transmitter components on the conductor 46, also provides a voltage at the junction of the contact 49 of the switch 48 and the diode 54. This voltage is applied through the diode 60 which is forward biased thereby so as to present a relatively low impedance. The diode 60 thus defines a charging means for rapidly charging the capacitor 62, it being understood that the resistor 61 has a relatively small value and does not significantly influence the charge time of the capacitor 62. Upon release of the movable contact 50 of the manually operable switch 48, the voltage applied to the diode 60 is removed, whereby the capacitor 62 now discharges relatively slowly through the resistor 63 and through several resistors in the generator 70, including the path defined by the resistors 72 and 74 and the path defined by the resistors 77 and 78, all of which resistors accordingly define a discharge means. The action just described produces at the output of the capacitor 62 for application to the first pulse generator 70 a negatively directed pulse. The turning on of the main switch (not shown) of the power supply 40 causes the transistors 71, 76, and 82 to be rendered conductive and the transistor 80 to be rendered nonconductive. The pulse during the discharge of the capacitor 62 renders nonconductive the transistor 71 which, in turn, renders transistors 76 and 82 nonconductive and transistor 80 conductive. Thus, a positively directed pulse 82a appears at the collector of the transistor 82 which defines the output of the first generator 70. The leading edge of the pulse 82a occurs at the time that the capacitor 62 starts to discharge slowly, and the trailing edge of the pulse 82a occurs at some point during that discharge. It should be apparent that the capacitor 62 and the resistors 63, 72, 74, 77, and 78 define a time constant network, the values of which control the duration of the pulse 82a. In other words, by increasing the value of the capacitor 62 and/or these resistors, the discharge time may be increased so as to increase the duration of the pulse 82a.

The pulse 82a is applied to the capacitor 83, which capacitor charges rapidly at the beginning of the pulse 82a. Upon termination of the *pulse* 82a, a negative pulse is developed for application to the second pulse generator 90. As was the case with the pulse generator 70, the transistors 91, 96, and 102 are normally conductive, and the transistor 100 is nonconductive. The application of the negative pulse renders the transistors 96 and 102 nonconductive and renders the transistor 100 conductive to produce a pulse 102a on the collector of the transistor 102, which defines the output of the second pulse generator 90. The leading edge of the pulse 102a coincides with the trailing edge of the pulse 82a. The duration of the pulse 102a is controlled by the value of the capacitor [103] *83* and the resistance provided by the resistors 92, 94, 97, and 98, these resistors therefore defining a discharge means. It should be noted that the discharge path is through the collector and emitter of the transistor 122, whereas the discharge path for the capacitor 106 was completed through the resistor 107.

There is provided a third pulse generator 110 which is shown in FIG. 2, the pulse generator 70 and havcisely the same construction as the generator 70 and having its components labeled with corresponding numerals with 40 added thereto. In the interest of brevity, further detailed description of the third pulse generator 110 will therefore be omitted. The junction of the contact 49 of the switch 48 and the diode 54 is also coupled by way of a conductor 103 through a diode 104, resistor 105, and a capacitor 106 to the third pulse generator 110. A resistor 107 is coupled to the junction of the diode 104 and the resistor 105 and is also coupled to ground reference potential. The appearance of the operating voltage on the conductor 103, as a result of the actuation of the switch 48, causes the capacitor 106 to charge, which charging occurs rapidly since the diode 104 is forwardly biased, it being understood that the value of the resistor 105 is such as to affect negligibly the charging time. Thus, the diode 104 provides a means for rapidly charging the capacitor 106. Upon release of the switch 48 and the consequent removal of the voltage on the conductor 103, the capacitor 106 slowly *discharges* [discharged] through the resistors 105 and 107 and through the paths defined by the resistors 112, 114 and 117, 118, whereby these resistors define a slow discharge means.

Accordingly, there is produced a negatively directed pulse which will render inoperative the transistor 111 in the third pulse generator 110, which, in turn, renders the transistors 116 and 122 therein nonconductive and the transistor 120 conductive. There is produced on [the conductor 123, which is coupled to] the collector of the transistor 122, a pulse 122a, the duration of which is controlled by the time for discharging the capacitor 106. The values of the capacitor 106 and the resistors 107, 112, 114, 117 and 118 are selected, such that the duration of the pulse 122a is at least about equal to the combined durations of the pulses 82a and 102a. Because of the concurrence of the leading edges of the negative pulses applied to the generators 70 and 110, the pulses 82a and 122a commence at the same point in time.

In an operative form of this invention, the first, second, and third pulse generators 70, 90, and 110 are part of a single integrated circuit.

The output from the third pulse generator 110 is coupled to a switching circuit 123 which includes an NPN-transistor 124 having its emitter grounded and its collector coupled through a resistor 125 to the A+ operating voltage. The collector of the transistor 124 is coupled through a resistor 126 to the base on a PNP-transistor 127, the emitter of which is coupled to the A+ operating voltage and the collector of which is coupled to a conductor 128. The pulse 122a renders conductive the transistor 124 which, in turn, renders conductive the transistor 127 for the duration of the pulse, whereby there appears on the conductor 128 a pulse 129 having a duration equal to the duration of the pulse 122a and commencing and terminating respectively at the same times.

Continuing the reference to FIG. 2, the transmitter 20 further comprises a first tone-generating circuit 130 which includes an oscillatory portion 131, the oscillatory [circuit] *portion* 131 being of standard construction and including an NPN-transistor 132 having its base coupled to a resistor 133 to ground reference potential and its emitter coupled through a resistor 134 to ground reference potential. A resistor 135 coupled from the A+ operating voltage to the base of the transistor 132 provides a biasing voltage thereon. A pair of capacitors 136 and 137 is coupled in series between the collector of the transistor 132 and the A+ operating voltage. There is provided a connection between the emitter of the transistor 132 and the junction of the capacitors 136 and 137. A coil 138 couples the collector of the transistor 132 to the conductor 128. The tone-generating circuit 130 also includes a first stage of amplification 140 having an NPN-transistor 141 with its base coupled, by way of a capacitor 142, to the emitter of the transistor 132, the emitter of the transistor 141 being coupled through a resistor 143 to ground reference potential. A capacitor 144 and a potentiometer 145 are coupled in series between the emitter of the transistor 141 and the conductor 146. *There is provided a biasing resistor 147 connected between the collector and the base of the transistor 141, the collector of the transistor 141 being coupled directly to the conductor 138 on which the supply voltage appears.*

In operation, turning on the power supply 40 causes the oscillatory portion 131 to produce an oscillatory signal, the frequency of which is determined by the values of the capacitors 136 and 137 and the coil 138. In an operative embodiment of the invention, the coil 138 had a plurality of taps thereon and, by proper selection of the taps, the amount of inductance furnished by the coil 138 and, thus, the frequency of the oscillatory signal can be varied. The oscillatory signal is coupled through the capacitor 142 and is amplified by the stage 140 to provide an oscillatory signal on the conductor 146, and, by adjusting the potentiometer 145, the amplitude of the signal can be selected.

There is also provided a second tone-generating circuit 150 which has the same construction, except for certain parts values, corresponding parts being labeled with the same reference numerals with 20 added thereto. In operation, turning on the power supply 40 causes the oscillatory portion 151 to produce an oscillatory signal, the frequency of which is determined by the values of the capacitors 156 and 157 and the coil 158. In an operative embodiment of the invention, the coil 158 had a plurality of taps thereon and by proper selection of the taps, the amount of inductance furnished by the coil 158 and, thus, the frequency of the oscillatory signal can be varied. The oscillatory signal is coupled through the capacitor 162 and is amplified by the stage 160 to provide an oscillatory signal on the conductor 166, and, by adjusting the potentiometer 165, the amplitude of the signal can be selected.

The oscillatory signal on the conductor 146 is coupled to a second stage of amplification 170, which stage includes an NPN-transistor 171 having a pair of biasing resistors 172 and 173 coupled in series between the collector and base thereof. The emitter is coupled to ground reference potential, and the collector is coupled through a load resistor 174 to the A+ supply voltage. The junction of the resistors 172 and 173 is coupled through a decoupling capacitor 175 to ground. Similarly, the oscillatory signal on the conductor 166 is coupled to a further stage of amplification 180, including a transistor 181 having a pair of biasing resistors 182 and 183 coupled in series between the base and collector thereof, the junction of those resistors being coupled through a decoy by capacitors 185 to ground. The emitter of the transistor 181 is coupled to ground reference potential, and the collector is coupled to common load resistor 174. There is also provided a capacitor 186 and a potentiometer 187 coupled in series between the load resistor 174 and ground reference potential, the movable arm 188 of the potentiometer 187 being coupled to a second input of the audio amplifier 23.

Associated with the amplifier stage 170 is a biasing network 190 including a first normally nonconductive NPN-transistor 191 having its emitter grounded, its collector coupled through a resistor 192 to the A+ operating voltage and its base coupled through a resistor 193 and a diode 194 to the output of the first pulse generator 70. The biasing network 190 also includes a second normally conductive NPN-transistor 195 having its base coupled to the collector of the transistor 191, its emitter grounded, and its collector coupled to the base of the transistor 171. The transistor 195 is rendered conductive by virtue of the current flowing through its base-emitter junction through the resistor 192, whereby there is effectively a low impedance between the collector of the transistor 195 and ground. Accordingly, the base of the transistor 171 is effectively grounded, and no signal applied thereto can be amplified thereby. The pulse 82a, which is generated by the pulse generator 70, is coupled through the diode 194 and the resistor 193 to render conductive the normally nonconductive transistor 191, whereby current flow is diverted from the transistor 195 through the collector and the emitter of the transistor 191. This substantially increases the impedance between the collector and the emitter of the transistor 195 effectively to unground the base of the transistor 171 to enable the oscillatory signal from the first tone-generating circuit 130 applied to the stage 170 to be amplified thereby.

Associated with the amplifier stage 180 is a biasing network 200 including a first normally nonconductive NPN-transistor 201 having its emitter grounded, its collector coupled through a resistor 202 to the A+ operating voltage and its base coupled through a resistor 203 and a diode 204 to the output of the second pulse generator 90. The biasing network 200 also includes a second normally conductive NPN-transistor 205 having its base coupled to the collector of the transistor 201, its emitter grounded, and its collector coupled to the base of the transistor 181. The transistor 205 is rendered conductive by virtue of the current flowing through its base-emitter junction through the resistor 202, whereby there is effectively a low impedance between the collector of the transistor 205 and ground. Accordingly, the base of the transistor 181 is effectively grounded, and no signal applied thereto can be amplified thereby. The pulse 102a, which is generated by the pulse generator 90, is coupled through the diode 204 and the resistor 203 to render conductive the normally nonconductive transistor 201, whereby current flow is diverted from the transistor 205 through the collector and the emitter of the transistor 201. This substantially increases the impedance between the collector and the emitter of the transistor 205 effectively to unground the base of the transistor 181 to enable the oscillatory signals from the second tone-generating circuit 150 applied to the stage 180 to be amplified thereby.

Finally, the transmitter 20 comprises a holding circuit 210, which holding circuit includes an NPN-transistor 211 having its base coupled through a resistor 212 to ground reference potential and its emitter coupled to ground. The base of the transistor 211 is also coupled through a resistor 213 and a diode 214 to the output of the switching circuit 123. The collector of the transistor 211 is coupled through a resistor 215 to the base of a PNP-transistor 216, the emitter of which is coupled to the A+ operating voltage. The collector of the transistor 216 is coupled through a diode *217* to a conductor 218 which is connected to the cathode of the diode 54.

In operation, the transistors 211 and 216 are normally nonconductive. The pulse 129 produced in response to the pulse 122a from the pulse generator 110 is of positive polarity and is coupled through the diode 214 and the resistor 213 to render conductive the transistor 211. Current flows from the A+ operating voltage through the base-emitter junction of the transistor 216 through the resistor 215 and the collector and the emitter of the transistor 211. Current will accordingly flow through the emitter and the collector of the transistor 216 through the diode 217 and through the relay winding 51 to close the contacts 52 and 53. Thus, current continues to flow through the winding 45 to maintain the contacts 42 and 44 closed and provide the B+ operating voltage on the conductor 46, even after the manually operable switch 48 has been opened. During the very short period between the time the switch 48 is opened and the time a voltage output from the holding circuit 210 is derived, the winding 51 remains energized to maintain the supply of the B+ operating voltage to the transmitter *20* [30] and thereby continue generating the carrier wave, by virtue of the charge developed across the capacitor 54a when the switch 48 was closed.

Describing now the overall operation of the transmitter 20, the operator first determines what receiver is to be called. Assuming that the selective communication calling system with which this transmitter 20 is used functions with a sequence of two control tones, the operator programs the tone-generating circuits 130 and 150 respectively to produce the two control tones to which the selected receiver responds. As previously explained, this selection process may be accomplished by choosing taps on the coils 138 and 158 respectively in the tone-generating circuits 130 and 150. Thus, when the tone-generating circuits 130 and 150 are energized, they will produce oscillatory signals respectively at the selected frequencies.

The operator then depresses the movable contact 50 of the switch 48, which, as previously explained, completes the circuit through the winding 51 to close the contacts 52 and 53. This completes a circuit for the winding 45 to close the contacts *42* [43] and 44 and thereby provide an operating voltage for the various components of the transmitter 20, particularly, the oscillator 21, the frequency multiplier 27, and the power output amplifier 29 which together define a carrier wave generating circuit. The application of the B+ operating voltage thus causes a carrier wave to be generated.

Also, the actuation of the switch 48, as previously explained, rapidly charges the capacitor 62 which feeds the first pulse generator 70 and also rapidly charges, through the conductor 103, and capacitor 106 which feeds the third pulse generator 110. Usually, the operator depresses the movable contact 50 of the switch 48 momentarily and then releases the same, thereby to remove the plus voltage and enable slow discharge of the capacitor 62. The values of the capacitor 62 and the resistor 63 are selected to cause the duration of the pulse 82a at the output of the generator 70 to be equal to the desired duration of the first control tone. The effective short-circuit placed on the base of the transistor 171 by the biasing network 190 is effectively removed by the application of the pulse 82a for the duration thereof. Also, the pulse 82a is applied to the second tone generator 90 which, as previously explained, produces a positively directed pulse 102a commencing with the termination of the pulse 82a. The short circuit on the base of the transistor 181 in the amplifier stage 180 furnished by the biasing network 200 is removed by the application thereto of the pulse 102a. Thus, the amplifier stage 170 which is normally inoperative becomes operative to amplify signals applied thereto for the duration of the pulse 82a. Thereafter, the amplifying stage 170 again becomes inoperative, and the amplifier stage 180 becomes operative for the duration of the pulse 102a to amplify signals applied thereto.

The plus voltage at the contact 49 of the switch 48, applied by way of the conductor 103, rapidly charges the capacitor 106, which is then discharged upon release of the movable contact 50. The negative pulse created thereby is applied to the third pulse generator 110 which, as previously explained, produces a pulse 122a. The values of the capacitor 106 and the resistor 107 are selected to cause the duration of the pulse 122a to be equal to or slightly greater than the combined durations of the pulses 82a and 102a. The pulse 122a is applied [along the conductor 123] to the tone generator circuits 130 and 150 to render them operative to produce at the outputs thereof respectively the first and second control tones. The control tones are applied by way of conductors 146 and 166 respectively to the amplifier stages 170 and 180. Because the amplifier stage 170 is operative only for the duration of the pulse 82a, a control tone will be amplified by the stage 170 and applied to the capacitor 184 for the duration of the pulse 82a. Immediately upon termination of the pulse 82a, the amplifier stage 170 becomes inoperative and the stage 180 becomes operative to amplify the second control tone from the generating circuit 150 for the desired duration of the second control tone. Of course, the tone-generating circuits 130 and 150 were operative for the entire duration of the pulse *122a* [122]. Thus, there is provided across the potentiometer 187 a sequence of two control tones for application to the audio amplifier 23, the amplitude of the control tones being selected by the setting of the movable arm 188. In an operative form, each control tone was transmitted for 100 milliseconds.

It is desirable to apply the long duration pulse [122] *122a* to the oscillator portions 131 and 151 respectively in the pulse tone-generating circuits 130 and 150 to assure that the second control tone has reached full amplitude at the time the second amplifier stage 180 becomes operative. It should be appreciated that applying the pulses 82a and 102a respectively directly to the tone-generating circuits 130 and 150 would function in the desired manner, except it would take a few cycles to develop full amplitude, not only with respect to the first control tone, but also with respect to the second control tone.

The pulse 122a applied to the holding circuit 210 causes a positive voltage to be applied along the conductor 218 to the relay winding 51 to cause current to flow therethrough and thus to maintain the B+ operating voltage on the conductor 46 for the duration of the pulse 122a. Accordingly, the carrier wave continues to be generated despite the open condition of the switch 48. The control tones are amplified in the audio amplifier 23 and are modulated on the oscillatory signal generated by the oscillator 21. The oscillatory signal modulated by the control tones is increased in frequency by the frequency multiplier 27 and increased in amplitude by the power output amplifier 29 and radiated by the antenna 30. The selected receiver is accordingly unsquelched. Upon completion of the control tones, the pulse 122a will have terminated, thereby to deenergize the relay 50 and thus discontinue generation of the carrier wave. However, at this time the operator will normally actuate the push-to-talk switch 55 to cause continued production of the carrier wave as previously described. The operator will speak into the microphone 23a, the sounds being converted into audio signals for modulation of the carrier wave. The rapid charging of the capacitors 62, 83, and 106, which are respectively coupled to the inputs of the three pulse generators 70, 90, and 110 [permit] *permits* them to generate the pulses even if the operator closes the manually operable switch momentarily.

Thus, the operator causes the carrier wave to be generated by actuating the switch 48 and causes that carrier wave automatically to be modulated by the control tones upon release of the switch 48. With such a construction, there is no chance that the carrier wave will not be fully on before the control tones are generated. The momentary actuation of the switch 48 insures that the entire sequence of control tones will be transmitted.

In an operative embodiment of the transmitter 20, the various components thereof had the following values; resistor 61, 2.2 kilohms; capacitor 62, 3.3 microfarads; resistor 63, 2.2 kilohms; resistors 72, 92, and 112, 16 kilohms; resistors 74, 94, and 114, 8 kilohms; resistors 77, 97, and 117, 12 kilohms; resistors 78, 98, and 118, 3 kilohms; resistors 79, 99, and 119, 6 kilohms; resistors 80a, 100a, and 120a, 2 kilohms; capacitor 83, 3.3 microfarads; resistors 105, 107, 2.2 kilohms; resistor 125, 100 kilohms; resistor 126, 8.2 kilohms; capacitor 106, 6.8 microfarads; capacitor 136, 0.047 microfarads; capacitor 137, 0.076 microfarads; coil 138, 3 henries; capacitor 142, 0.01 microfarads; resistor 133, 8.2 kilohms; resistor 134, 47 kilohms; resistor 135, 22 kilohms; resistor 143, 10 kilohms; capacitor 144, 0.01 microfarads; potentiometer 145, 150 kilohms; capacitor 156, 0.047 microfarads; capacitor 157, 0.012 microfarads; coil 158, 0.75 henries; capacitor 162, 0.01 microfarads; resistor 153, 8.2 kilohms; resistor 154, 47 kilohms; resistor 155, 22 kilohms; resistor 163, 10 kilohms; resistor 172, 47 kilohms; resistor 173, 220 kilohms; capacitor 164, 0.01 microfarads; capacitor 185, 0.01 microfarads; potentiometer 165, 150 kilohms; capacitor 186, 0.1 microfarads; potentiometer 187, 5 kilohms; resistor 182, 47 kilohms; resistor 183, 220 kilohms; resistor 192, 22 kilohms; resistor 193, 100 kilohms; resistor 202, 22 kilohms; resistor 203, 100 kilohms; resistor 212, 2.2 megohms; resistor 213, 100 kilohms; resistor 215, 10 kilohms.

What has been described, therefore, is an improved transmitter for use in a selective calling communication system which transmitter first generates a carrier wave and then modulates the carrier wave with one or more control tones and insures that the carrier wave is fully on before it is modulated.

While there has been described what is at present considered to be a preferred embodiment of the invention, it is understood that various changes and modifications can be made therein without departing from the spirit and scope of the invention, and it is intended that all such changes and modifications be covered as fall within the scope of the appended claims.

What is claimed is:

1. In a transmitter having a carrier-wave-generating circuit and an information-generating circuit and a modulator for modulating the carrier wave in accordance with the information, the combination comprising electronic first switching means having a transmitter-energized position for coupling a source of operating voltage to the carrier wave generating circuit, second switching means coupled to said first switching means and having a first position to couple a voltage thereto for placement thereof in its transmitter-energized position and having a second position to isolate the voltage from said first switching means, a control circuit operatively coupled to said second switching means and responsive to the placement thereof in said first position and thereafter in said second position to provide energizing signals, said information-generating circuit being coupled to the output of said control circuit and being responsive to the application thereto of the energizing signals to generate information for modulation on said carrier wave, and a holding circuit operatively coupled to said control circuit and to said first switching means and responsive to the application of the energizing signals to maintain said first switching means in its transmitter-energized position despite said second switching means being in its second position, whereby movement of said second switching means to its first position causes said carrier-wave-generating circuit to generate said carrier wave and the subsequent movement of said second switching means to said second position causes said information-generating circuit to generate said information.

2. In the transmitter set forth in claim 1, wherein said electronic first switching means is a relay having a winding coupled to said second switching means and a pair of contacts respectively coupled to the source of operating voltage and the carrier-wave-generating circuit, the transmitter energized position occurring when said contacts are closed.

3. In the transmitter set forth in claim 1, wherein said second switching means is manually operable.

4. In the transmitter set forth in claim 1, wherein said second switching means is closed in said first position and is open in said second position.

5. In the transmitter set forth in claim 1, wherein said second switching means is manually operable and is spring loaded to said second position.

6. In the transmitter set forth in claim 1, wherein said control circuit is electrically coupled to said second switching means.

7. In the transmitter set forth in claim 1, wherein said holding circuit is electrically coupled to said control circuit.

8. In the transmitter set forth in claim 1, wherein said control circuit includes a capacitor, charging means coupled from said second switching means to said capacitor for rapid charge thereof when said second switching means is placed in said first position and then in *said* second position, discharge means coupled to said capacitor for slow discharge thereof while said second switching means is in its second position, and an electronic switch coupled to said capacitor and responsive to the rapid charge and slow discharge thereof to provide energizing pulses.

9. A transmitter comprising a carrier wave generating circuit, a first tone-generating circuit for generating a first control tone having a given frequency, a second tone-generating circuit for generating a second control tone having a different frequency, a modulator coupled to said tone-generating circuits and to said carrier wave generating circuit for modulating the carrier wave in accordance with the control tones, electronic first switching means having a transmitter energized position for coupling a source of operating voltage to said carrier wave generating circuit, second switching means coupled to said first switching means and having a first position to couple a voltage thereto for placement thereof in its transmitter energized position and having a second position to isolate the voltage from said first switching means, a first pulse generator operatively coupled to said second switching means and responsive to the placement thereof in its first position and thereafter in the second position to provide a first pulse having a first predetermined duration, said first tone-generating circuit being coupled to the output of said first pulse generator and being responsive to the application thereto of said first pulse for generating said first control tone for said first predetermined duration, a second pulse generator coupled to the output of said first [tone control circuit] *pulse generator* and responsive to the termination of said first pulse to provide a second pulse of a second predetermined duration, said second tone-generating circuit being coupled to the output of said second pulse generator and being responsive to the application thereto of said second pulse for generating said second control tone for said second predetermined duration, and a holding circuit operatively coupled to said pulse generators and to said first switching means and operative in the presence of said pulses to maintain said first switching means in its transmitter energized position despite said second switching means being in its second position, whereby movement of said second switching means to its first position causes said carrier-wave-generating circuit to generate said carrier wave and the subsequent movement of said second switching means to its second position causes said first and second tone-generating circuits respectively to generate said first control tone followed substantially immediately by said second control tone.

10. The transmitter set forth in claim 9, wherein said carrier-wave-generating circuit includes an oscillator for applying a given frequency oscillatory signal to said modulator, a frequency multiplier circuit coupled to the output of said modulator for increasing the frequency of the modulated oscillatory signal, and an amplifier circuit for increasing the level of the higher frequency modulated oscillatory signal.

11. The transmitter set forth in claim 9, wherein each tone-generating circuit includes an oscillator portion and an amplifier portion, one of said portions of each of said tone-generating circuits being inoperative and respectively coupled to said pulse generators, whereby the provision of said first pulse causes said one portion in said first tone-generating circuit to become operative to cause said first control tone to be generated, and whereby the subsequent provision of said second pulse causes the corresponding portion of said second tone-generating circuit to become operative to cause said second control tone to be generated.

12. The transmitter set forth in claim 9, wherein said first pulse generator includes a first capacitor, first charging means coupled from said second switching means to said first capacitor for rapid charge thereof when said second switching means is placed in said first position and then in said second position, first discharge means coupled to said first capacitor for slow discharge thereof, while said second switching means is in its second position, and a first electronic switch coupled to said first capacitor and responsive to the rapid charge and slow discharge thereof to provide said first pulse, said second pulse generator including a second capacitor, second charging means coupled from the output of said first pulse generator to said capacitor for rapid charge thereof upon termination of said first pulse, and said second discharge means coupled to said second capacitor for slow discharge thereof, and a second electronic switch coupled to said second capacitor and responsive to the rapid charge and slow discharge thereof to provide said second pulse.

13. A transmitter comprising a carrier-wave-generating circuit, a first tone-generating circuit for generating a first control tone having a given frequency, a second tone-generating circuit for generating a second control tone having a different frequency, a modulator coupled to said tone-generating [circuit] *circuits* and to said carrier-wave-generating circuit for modulating the carrier wave in accordance with the control tones, electronic first switching means having a transmitter-energized position for coupling a source of operating voltage to said carrier-wave-generating circuit to generate the carrier wave, second switching means coupled to said first switching means and having a first position to couple a voltage thereto for placement thereof in its transmitter-energized position and having a second position to isolate the voltage from said first switching means, a first pulse generator operatively coupled to said second switching means and responsive to the placement thereof in its first position and thereafter in its second position to provide a first pulse having a first predetermined duration, said first tone-generating circuit being coupled to the output of said first pulse generator and being responsive to the application thereto of said first pulse to said first tone-generating circuit for generating said first control tone for said first predetermined duration, a second pulse generator coupled to the ouput of said first [tone control circuit] *pulse generator* and responsive to the termination of said first pulse to provide a second pulse of a second predetermined duration, said second tone-generating circuit being coupled to the ouput of said second pulse generator and being responsive to the application thereto of said second pulses for generating said second control tone for said second predetermined duration, a third pulse generator operatively coupled to said second switching means and responsive to the placement thereof in its first position and thereafter in its second position to provide a third pulse having a duration of at least about equal to the combined duration of said first and second pulses and commencing substantially with the commencement of said first pulse, and a holding circuit coupling the output of said third pulse generator to said first switching means and operative in the presence of said third pulse to maintain said first switching means in its transmitter-energized position despite said second switching means being in its second position, whereby movement of said second switching means to its first position causes said carrier-wave-generating circuit to generate said carrier wave and the subsequent movement of said second switching means to its second position causes said first and second tone-generating circuits respectively to generate said first control tone followed substantially immediately by said second control tone.

14. The transmitter set forth in claim 13, wherein each tone-generating circuit includes a normally inoperative oscillator portion and a normally inoperative amplifier portion, one of said portions in said first tone-generating circuit being coupled to said first pulse generator so as to become operative for the duration of said first pulse, the other portion in said first tone-generating circuit being coupled to the output of said third pulse generator to become operative for the duration of said third pulse, the portion in said second tone-generating circuit corresponding to said one portion being coupled to said second pulse generator so as to become operative for the duration of said second pulse, the other portion in said second tone-generating circuit being coupled to the output of said third pulse generator to become operative for the duration of said third pulse.

15. The transmitter set forth in claim 13, wherein each tone-generating circuit includes a normally inoperative oscillator portion and a normally inoperative amplifier portion, the amplifier portion in said first tone-generating circuit being coupled to said first pulse generator so as to become operative for the duration of said first pulse, the amplifier portion in said second tone-generating circuit being coupled to the output of said second pulse generator to become operative for the duration of said second pulse, the oscillator portion in each of said tone-generating circuits being coupled to the output of said third pulse generator to become operative for the duration of said third pulse.

16. A transmitter comprising a carrier-wave-generating circuit, a microphone for converting sound applied thereto into audio signals, a tone-generating circuit for generating at least one control tone, an audio amplifier for receiving and amplifying the audio signals and the control tone, a modulator coupled to said audio amplifier and to the carrier-wave generating circuit for modulating the carrier wave in accordance with the audio signals and the control tone, first electronic switching means including a first control element and a pair of first terminals respectively coupled to a source of operating voltage and to said carrier-wave-generating circuit, second electronic switching means including a second control element and a pair of second terminals coupled in series with said first control element and a current source, a first manually operable switch coupled in series with said second control element and a current source, whereby closure of said first manually operable switch couples current through said second control element electrically to connect said second terminals to cause current to flow through said first control element electrically to connect said first terminals and to cause the operating voltage to be supplied to said carrier-wave-generating circuit, a control circuit electrically coupled to the second mentioned of said first pair of terminals and responsive to said first manually operable switch being sequentially closed and then opened to provide energizing signals, said tone-generating circuit being coupled to the output of said control circuit and being responsive to the application thereto of the energizing signals to generate the control tone for modulation on said carrier wave, and a holding circuit coupled to said control circuit and to said first electronic switching means and responsive to the application of the energizing signals for maintaining said first electronic switching means in its transmitter-energized position despite said *first* manually operable switch being opened, whereby movement of said first manually operable switch to its first position causes said carrier-wave-generating circuit to generate said carrier wave and the subsequent movement of said first manually operable switch to said second position causes said tone-generating circuit to generate said control tone, a second manually operable switch coupled in parallel with said pair of second terminals and having a closed position to cause current to flow through said first control element electrically to connect [four of] said first terminals to cause the operating voltage to be supplied to said carrier-wave-generating circuit, whereby closure of said second manually operable switch causes a carrier wave to be generated on which may be modulated audio signals induced in response to sounds applied to said microphone.

17. The transmitter set forth in claim 16, wherein each of said electronic switching means is a relay having a winding which corresponds to said control element and a pair of contacts which correspond to said pair of terminals.

18. The transmitter set forth in claim 16, wherein each of said manually operable switches is spring loaded to its open position.

*19. In a transmitter having a carrier wave generating circuit and a power supply therefor and an information-generating circuit and a modulator for modulating the carrier wave in accordance with the information, the combination comprising switching means coupled to the power supply and having a first position to couple a voltage thereto for energization thereof and having a second position to isolate the voltage from the power supply, a control circuit operatively coupled to said switching means and responsive to the placement thereof in said first position and thereafter in said second position to provide energizing signals, said information generating circuit being cou-*

*pled to the output of said control circuit and being responsive to the application thereto of the energizing signals to generate information for modulation on said carrier wave, and a holding circuit operatively coupled to said control circuit and to the power supply and responsive to the application of the energizing signals to maintain the power supply energized despite said switching means being in its second position, whereby movement of said switching means to its first position causes said carrier wave generating circuit to generate said carrier wave and the subsequent movement of said switching means to said second position automatically continues transmission of the carrier wave and causes said information-generating circuit to generate said information.*

References Cited

The following references, cited by the Examiner, are of record in the patented file of this patent or the original patent.

UNITED STATES PATENTS

| | | | |
|---|---|---|---|
| 2,974,221 | 3/1961 | Peth | 325—64 |
| 3,496,467 | 2/1970 | Lundgren | 325—55 X |
| 3,500,458 | 3/1970 | Cannalte | 325—169 X |
| 3,513,399 | 5/1970 | Wycoff | 325—55 X |

ALBERT J. MAYER, Primary Examiner

U.S. Cl. X.R.

325—152, 169; 340—171